United States Patent Office 2,908,570
Patented Oct. 13, 1959

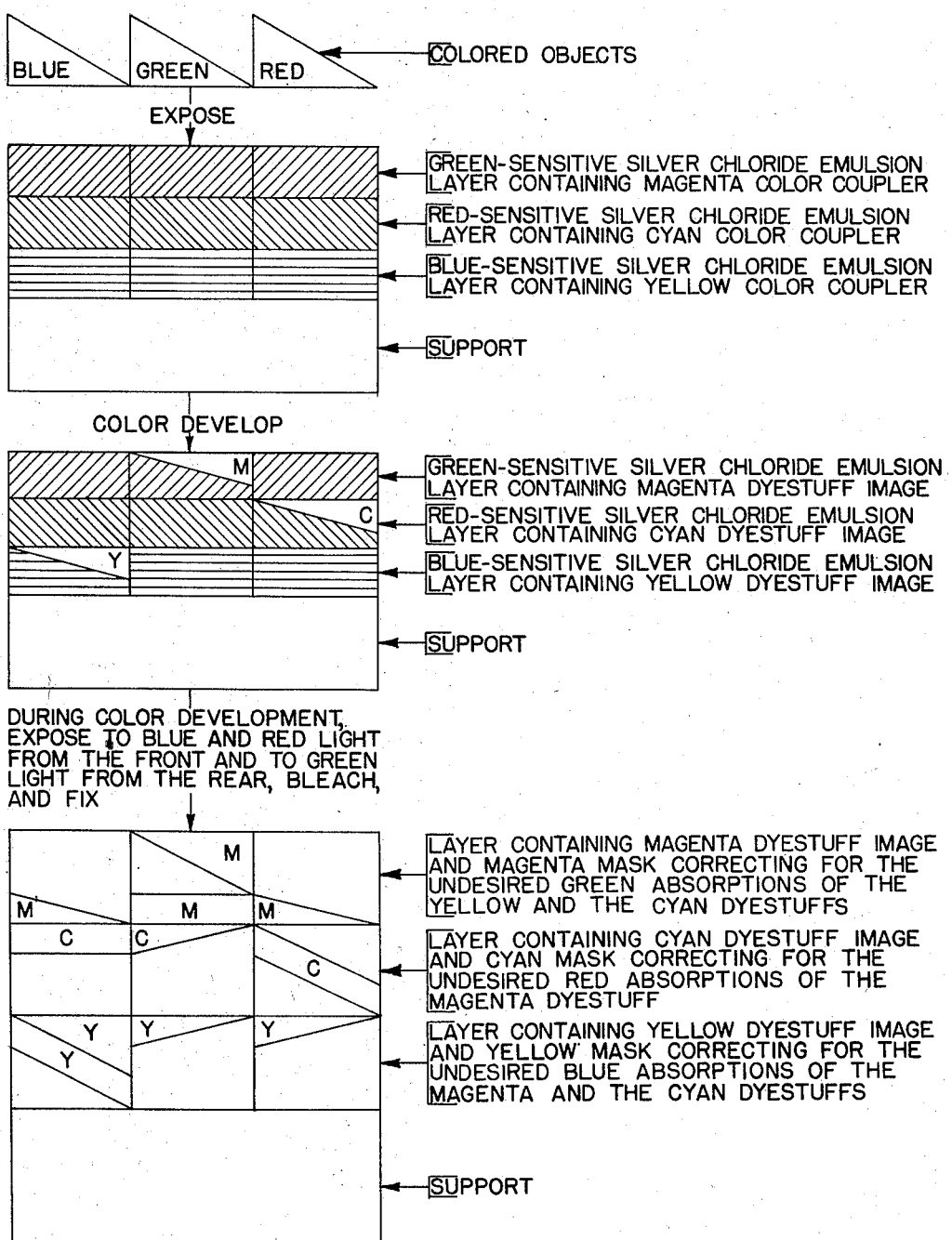

2,908,570
PRODUCTION OF PHOTOGRAPHIC MULTICOLOR IMAGES

Louis Achilles Meeussen, Mortsel-Antwerp, Belgium, assignor to Gevaert Photo-Producten N.V., Mortsel-Antwerp, Belgium, a Belgian company Application April 28, 1953, Serial No. 351,706

Claims priority, application Great Britain May 7, 1952

7 Claims. (Cl. 96—9)

This invention relates to a process for the production of photographic multicolor images, and more particularly to a process which ensures improved color reproduction.

As known, a subtractive multicolor image is composed of at least two dyestuff images. In subtractive three-color photography, the dyestuffs composing these images should completely absorb the visible light in one third of the spectrum and completely transmit the remaining part.

However, ordinarily available dyestuffs do not fulfil these spectral requirements. Especially the cyan dyestuffs and the magenta dyestuffs are not satisfactory. The cyan dyestuffs do not sufficiently absorb red light and, moreover, show an undesirable absorption of green, and particularly blue, light. Similarly, the magenta dyestuffs do not sufficiently absorb green light and show an undesirable absorption of blue light.

To compensate such undesirable absorption of a part image, different methods have already been proposed, which are all based upon the principle of copying, after complete development of the part images, the one showing a defective absorption into a layer wherein the resulting negative of the defective image (or resulting positive if the defective image is a negative) is processed to a color absorbing the light which is undesirably absorbed by the defective image. For instance, the cyan image absorbing blue light, which absorption is undesirable, is copied into a layer wherein the resulting image is processed to a yellow color.

It is an object of my invention to provide a process for the production of a photographic multicolor image, in which process the explained defects are compensated in a very simple way.

This object is accomplished by exposing the photographic material during color development to light.

According to the present invention, a multicolor image is formed by exposing a photographic multilayer material to light, color-developing same, and reexposing to light while color-developing.

The color of the light and the side of the multilayer material which is to be exposed depend on the structure of the material.

The reexposure may be performed while the photographic material is in the developer, or the material may be taken out of the developer for reexposure and reintroduced afterwards in the same or another color developer. In the latter case, the reexposure may be preceded by a short rinse.

Since the development continues during the subsequent rinsing operation, the reexposure may also be performed while the photographic material is brought from the developer into the rinsing bath, or even during the rinsing operation itself.

For instance, a multilayer material which comprises from the bottom to the top

A layer sensitive to red and blue and containing a cyan coupler,

A layer sensitive to green and blue and containing a magenta coupler,

A yellow filter layer, and

A layer sensitive to blue and containing a yellow coupler is exposed during color development to green light from the front and rear.

The green light from the rear copies the cyan image, which is being developed, into the green sensitive layer wherein a weak positive of the cyan image is formed in magenta color, correcting thus the defective absorption of the cyan image in the green region.

The green light from the front copies the yellow image, which is being developed, into the green sensitive layer wherein a weak positive of the yellow image is formed in magenta color, correcting thus the defective absorption of the yellow image in the green region.

A multilayer material which comprises from the bottom to the top

A layer sensitive to blue only and containing a yellow coupler,

A layer sensitive to red and short-waved blue and containing a cyan coupler, and A layer sensitive to green and short-waved blue and containing a magenta coupler is exposed during color development to blue light from 430–490 mµ and to red light from the front and to green light from the rear. This exposure is illustrated in the accompanying flow diagram.

A technical step which may be of valuable assistance in my new method of color correction consists in the conversion of light of a given color into light of another either longer-waved or shorter-waved color. This conversion may be effected by means of either a fluorescent screen or the so-called image converter tube. For instance, in the case of the above described photographic multilayer material containing a yellow filter layer, the green light coming from the rear of the photographic multilayer material may be converted at the front side by means of an image converter tube into blue light and directed back onto the photographic multilayer material, so that in the upper layer a yellow mask image results which will compensate the undesirable blue absorption of both the cyan and magenta images. An exposure from the rear directly with blue light cannot give this result since blue light is absorbed by the yellow filter layer whereas green light is transmitted.

The green light from the rear provides for the correction of the undesirable green absorption of the yellow and cyan images, the blue light from the front for the correction of the undesirable blue absorption of the magenta and cyan images, and the red light from the front for the correction of the undesirable red absorption of the magenta image.

Example 1

A strip of a Gevacolor negative ciné film is exposed in a Kodak II B sensitometer through an R678 filter (exposure to red light) and a step wedge, developed for 5½ minutes at 20° C. in a developer G23 which has the following composition:

(A) Diethyl-para-phenylene diamine sulphate_gm__ 2.75
    Water to make 100 cc.
(B) Water _____cc__ 800
    Sodium hexameta phosphate _____gm__ 1
    Sodium sulphite (anhydrous) _____gm__ 2
    Potassium carbonate _____gm__ 75
    Hydroxylamine hydrochloride _____gm__ 1.2
    Potassium bromide _____gm__ 0.5
    Water to make 900 cc.
    (Just prior to use, (B) is added to (A))

is rinsed for 30 seconds, fixed for 8 minutes in a bath G51 which has the following composition:

| | | |
|---|---|---|
| Water | cc | 800 |
| Sodium thiosulphate (cryst.) | gm | 300 |
| Sodium sulphite (anhydrous) | gm | 13 |
| Potassium-meta-bisulphite | gm | 12 |
| Acetic acid (glacial) | cc | 10 |
| Potassium alum | gm | 15 |

Water to make 1000 cc.

rinsed for 15 minutes, bleached for 8 minutes in a bath G41 which has the following composition:

| | | |
|---|---|---|
| Water | cc | 800 |
| Potassium ferricyanide | gm | 100 |
| Acetic acid (glacial) | cc | 13 |
| Sodium hydroxide | gm | 5 |
| Potassium bromide | gm | 15 |

Water to make 1000 cc.

rinsed for 5 minutes, fixed for 5 minutes in a bath G52 which has the following composition:

| | | |
|---|---|---|
| Water | cc | 800 |
| Sodium thiosulphate (cryst.) | gm | 300 |
| Sodium sulphite (cryst.) | gm | 20 |
| Sodium hexa-meta-phosphate | gm | 1 |

Water to make 1000 cc.

and finally rinsed for 15 minutes.

It should be understood that the Gevacolor negative ciné film substantially comprises from the top to the bottom An emulsion layer sensitive only to blue and containing a yellow coupler,
A yellow filter layer,
An emulsion layer sensitive to blue and green and containing a magenta coupler, and
An emulsion layer sensitive to blue and red and containing a cyan coupler.

The absorption in the blue, green and red regions by the wedge image, obtained as described above, is measured by means of an Ansco color densitometer.

Another strip of the same Gevacolor negative ciné film is exposed as indicated hereinbefore, developed for 4 minutes at 20° in a developer G23 as above, rinsed for 30 seconds, exposed for 30 seconds to light of a 15 watt lamp at a distance of 0.30 m. from the rear through the filters G537 and G5 (exposure to green light), developed for 1 minute at 20° in the developer G23, rinsed for 30 seconds and further treated as has already been described.

The green absorption, the blue absorption, and the red absorption of the wedge image obtained in this way are measured as explained above. The green and blue absorptions are found to be greatly improved. It may occur that the masking effect is somewhat exaggerated. Such overcorrection can be avoided by performing the reexposure at a later stage of the development.

One may be surprised at the correction of not only the green absorption but also the blue absorption by an additional exposure to green light, which exposure causes the formation of some additional magenta dye in the green-sensitive layer. This correction effect is conceivable when one considers that magenta dyes not only absorb green light as desired but also blue light.

*Example 2*

Another strip of the same Gevacolor negative ciné film is exposed in a Kodak II B sensitometer through the filters G537 and G5 (exposure to green light) and a step wedge, developed for 5½ minutes at 20° in the developer G23 described in Example 1.

The green absorption and the undesirable red absorption of the wedge image obtained in this manner are measured as indicated in Example 1.

Another strip of the same Gevacolor negative ciné film is exposed as above, developed for 4 minutes at 20° in the developer G23 described in Example 1, rinsed for 30 seconds, exposed for 30 seconds to light of a 15 watt lamp at a distance of 0.30 m. from the front through an R678 filter (exposure to red light), developed for 1 minute at 20° in the developer G23 described in Example 1, rinsed for 30 seconds and further treated as above.

The green absorption and the red absorption of the wedge image obtained in this way are measured as described above. The red absorption is overcorrected in the central steps of the wedge image. This can be avoided as explained in Example 1. The absorption of the densest areas is of minor importance and is due to some sensitivity to the green light of the emulsion layer wherein the cyan image is formed.

*Example 3*

Another strip of the same Gevacolor negative ciné film is exposed in a Kodak II B sensitometer through the filter R619 (exposure to red light) and a step wedge, developed for 5½ minutes at 20° in the developer G23 described in Example 1, and further treated as the first mentioned strip of Example 1.

The red absorption and the undesirable green and blue adsorptions of the wedge image obtained in this manner are measured as described in Example 1.

Another strip of the same Gevacolor negative ciné film is exposed as above, developed for 6 minutes at 20° in the developer G23 described in Example 1, exposed for 5 seconds to the light of a 100 watt lamp at a distance of 0.60 m. from the rear through a G537 filter (exposure to green light), developed for 30 seconds at 20° in the developer G23 described in Example 1, rinsed for 25 seconds, exposed for 5 seconds to the light of a 100 watt lamp at a distance of 0.60 m. from the front through an R619 filter (exposure to red light), rinsed for 10 seconds and further treated as above.

The green absorption, the blue absorption and the red absorption of the wedge image obtained in this way are measured as described in Example 1. The green and blue absorptions are greatly improved. As a result of the reexposure to red light, the undesirable absorption of red by the magenta dyestuff, formed after the reexposure to green light, has been compensated by the formation of a faint supplementary cyan image.

*Example 4*

Another strip of the same Gevacolor negative ciné film is exposed in a Kodak II B sensitometer through the filters G537 and G5 (exposure to green light) and a step wedge, developed for 5½ minutes at 20° in the developer G23 described in Example 1, and further treated as the first mentioned strip of Example 1.

The green absorption and the undesirable blue and red absorptions of the wedge image obtained in this manner are measured as described in Example 1.

Another strip of the same Gevacolor negative ciné film is exposed as above and further treated as the second mentioned strip of Example 3.

The green absorption, the blue absorption and the red absorption of the wedge image obtained in this way are measured as indicated above. The red and blue absorptions are considerably improved.

The sudden increase of the red absorption at the highest density may be due to some sensitivity to green light of the layer sensitized to red, or to the transmission of some red light by the filters G537 and G5.

The foregoing examples are merely illustrative of the features of this invention. Obviously, the said invention may be applied to multilayer material of a different structure or type. The color of the correction light is determined by such structure and by the correction desired.

I claim:

1. Process for the production of a photographic multicolor image, comprising exposing to light a photographic material containing at least two superposed light-sensitive silver halide emulsion layers sensitive to different portions of the spectrum, and color couplers in said layers, which couple with the oxidation product of an aromatic amino developing agent to form dyes, treating said material as a first stage after exposure to light by a color developer containing an aromatic amino developing agent, and then printing the image already formed in one silver halide emulsion layer by said color developer, before the photographic material is removed from the said developer, in another silver halide emulsion layer of said photographic material.

2. Process for the production of a photographic multicolor image, comprising exposing to light a photographic material containing at least two superposed light-sensitive silver halide emulsion layers sensitive to different portions of the spectrum, and color couplers in said layers, which couple with the oxidation product of an aromatic amino developing agent to form dyes, treating said material as a first stage after exposure to light by a color developer containing an aromatic amino developing agent, and then printing the image already formed in one silver halide emulsion layer by said color developer, before color development is completed and while the photographic material is taken out of the color developer, in another silver halide emulsion layer of said photographic material, whereafter the latter is reintroduced into a color developer.

3. Process for the production of a photographic multicolor image, comprising exposing to light a photographic material containing at least two superposed light-sensitive silver halide emulsion layers sensitive to different portions of the spectrum, and color couplers in said layers, which couple with the oxidation product of an aromatic amino developing agent to form dyes, treating said material as a first stage after exposure to light by a color developer containing an aromatic amino developing agent, and then printing the image already formed in one silver halide emulsion layer by said color developer, before color development is completed and while the photographic material after being rinsed is taken out of the color developer, in another silver halide emulsion layer of said photographic material, whereafter the latter is reintroduced into a color developer.

4. The process for the production of a photographic multicolor color image, comprising exposing to light a photographic material containing at least two superposed light-sensitive silver halide emulsion layers sensitive to different portions of the spectrum, and color couplers in said layers, which couple with the oxidation product of an aromatic amino developing agent to form dyes, treating said material as a first stage after exposure to light by a color developer containing an aromatic amino developing agent, and then printing the image already formed in one silver halide emulsion layer by said color developer, before the photographic material is removed from the said developer, in another silver halide emulsion layer of said photographic material, whereafter the latter is rinsed, freed from silver, and fixed.

5. Process for the production of a photographic multicolor image, comprising exposing to light a photographic material containing at least two superposed light-sensitive silver halide emulsion layers sensitive to different portions of the spectrum, and color couplers in said layers, which couple with the oxidation product of an aromatic amino developing agent to form dyes, treating said material as a first stage after exposure to light by a color developer containing an aromatic amino developing agent, and then printing the image already formed in one silver halide emulsion layer by said color developer, while the photographic material, subsequently to the development, is rinsed and before the photographic material is taken out of the rinsing water, in another silver halide emulsion layer of said photographic material.

6. Process for the production of a photographic multicolor image, wherein a photographic multilayer material comprising from the bottom to the top a layer sensitive to red and blue and containing a cyan color coupler, a layer sensitive to green and blue and containing a magenta color coupler, a yellow filter layer, and a layer sensitive to blue and containing a yellow color coupler, is exposed to light and treated as a first stage after exposure to light by a color developer containing an aromatic amino developing agent, and the images already formed in an outer silver halide emulsion layer by said color development are then printed, before color development is completed, in the middle silver halide emulsion layer by exposure to green light from the front and from the rear.

7. Process for the production of a photographic multicolor image, wherein a photographic multilayer material comprising from the bottom to the top a layer sensitive to blue only and containing a yellow color coupler, a layer sensitive to red and short-waved blue and containing a cyan color coupler, and a layer sensitive to green and short-waved blue and containing a magenta color coupler is exposed to light and treated by a color developer containing an aromatic amino developing agent as a first stage after exposure, and the images already formed in the silver halide emulsion layers by said color development are then printed, before the photographic material is removed from the developer, as follows: the images of the lower two emulsion layers in the upper emulsion layer by green light from the rear, the image of the upper emulsion layer in the middle emulsion layer by red light from the front, and the images of the upper two emulsion layers in the lowermost emulsion layer by blue light of 430 to 490 m$\mu$ from the front.

References Cited in the file of this patent

UNITED STATES PATENTS

| | | |
|---|---|---|
| 2,186,054 | Weaver | Jan. 9, 1940 |
| 2,348,735 | Gaspar | May 16, 1944 |
| 2,456,954 | Knott et al. | Dec. 21, 1948 |